F. D. SIMPSON.
RAKE.
APPLICATION FILED DEC. 27, 1915.
1,279,597.
Patented Sept. 24, 1918.
2 SHEETS—SHEET 2.
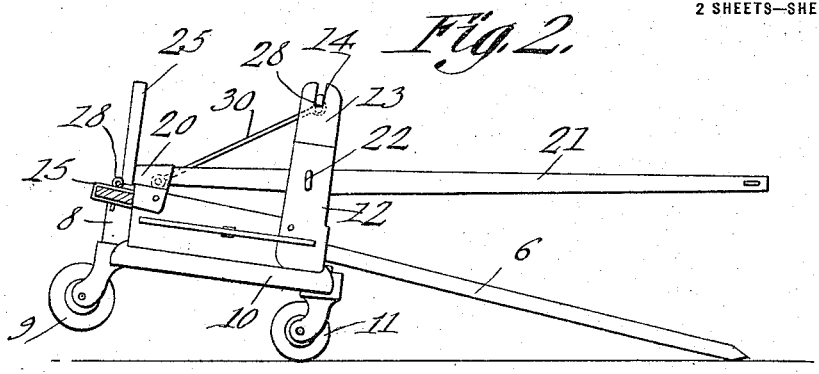
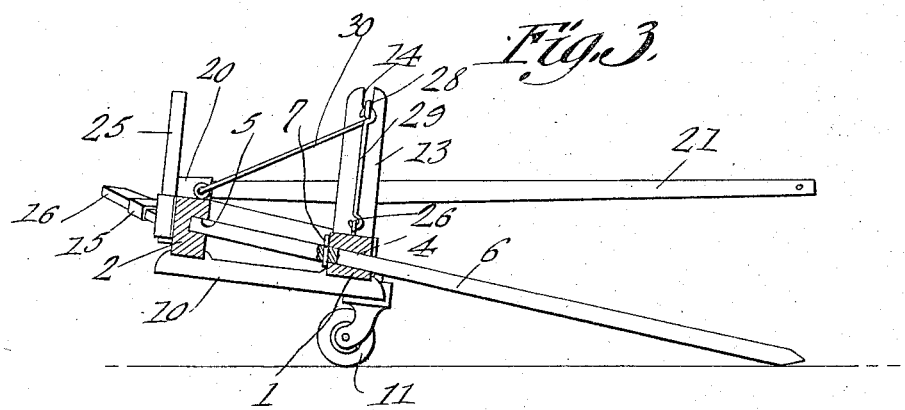
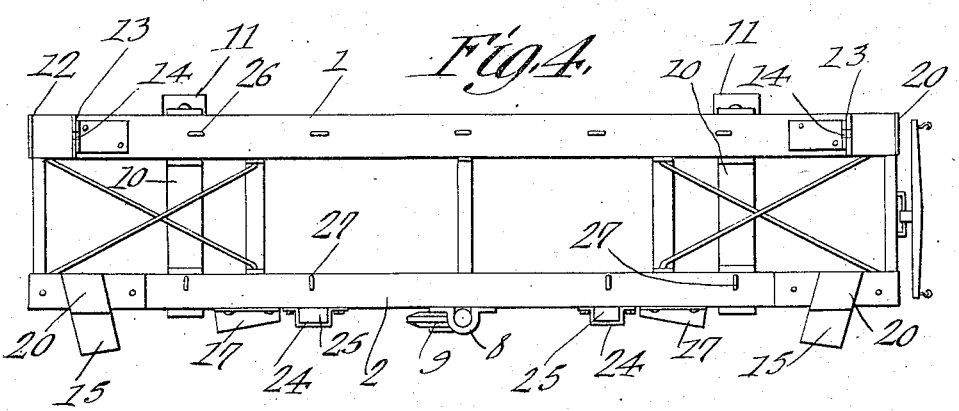
Witnesses
J. R. Tomein
M. E. McCarthy
F. D. Simpson
Inventor
by C. A. Snow & Co.
Attorneys

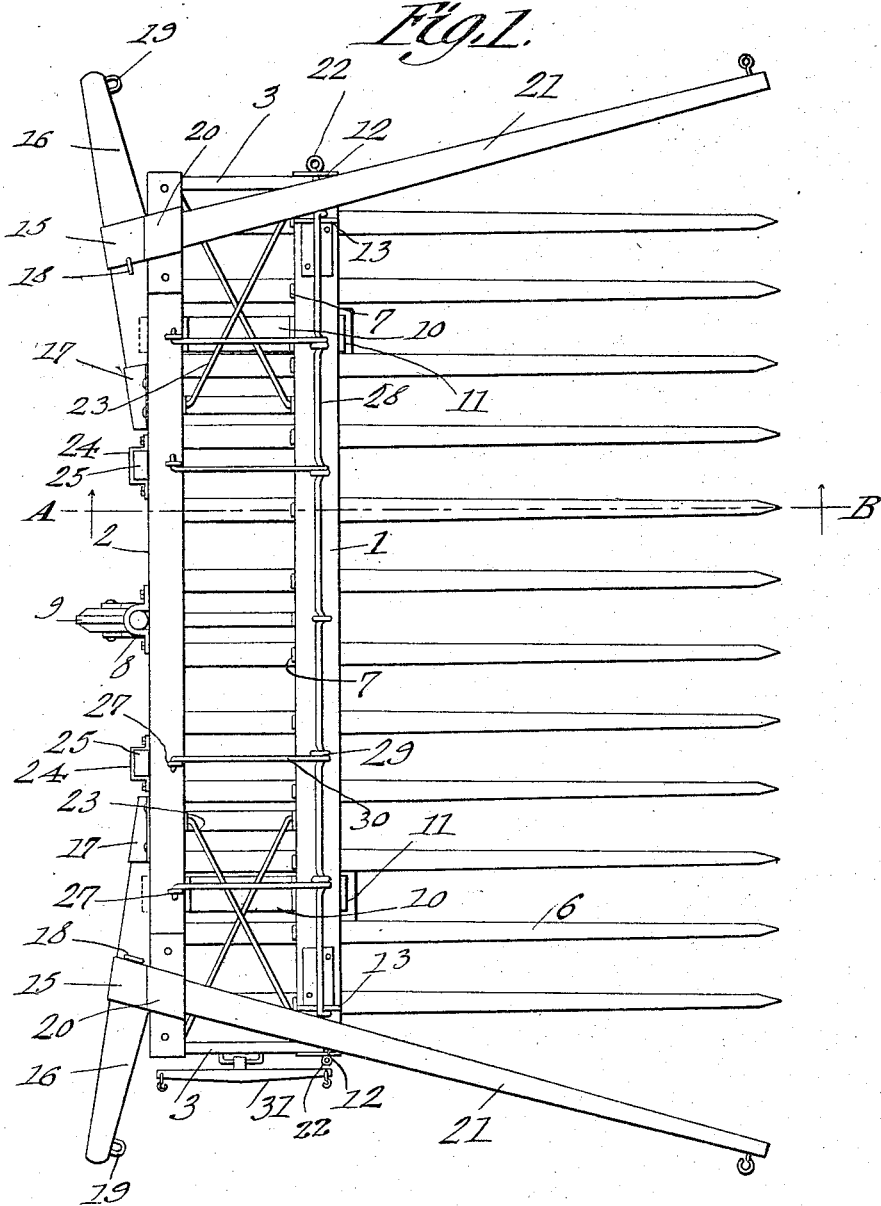

UNITED STATES PATENT OFFICE.

FRED D. SIMPSON, OF LONE GROVE, OKLAHOMA, ASSIGNOR OF ONE-HALF TO JAMES R. TALIAFERRO, OF ARDMORE, OKLAHOMA.

RAKE.

1,279,597.   Specification of Letters Patent.   Patented Sept. 24, 1918.

Application filed December 27, 1915. Serial No. 68,876.

*To all whom it may concern:*

Be it known that I, FRED D. SIMPSON, a citizen of the United States, residing at Lone Grove, in the county of Carter and State of Oklahoma, have invented a new and useful Rake, of which the following is a specification.

This invention relates to rakes of that type known as sweep rakes, one of its objects being to provide a structure of this type having removable tines and draft tongues which can be quickly set up or removed from active positions, the rear or frame portion of the rake being mounted on wheels so disposed as to support the rear portion of the rake when the said rake is in use and likewise to support the rake when the parts thereof are disassembled.

A further object is to provide a rake which, when disassembled, can be arranged in a compact structure capable of being drawn through a comparatively narrow space, such as a gate-way.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of a rake embodying the present improvements.

Fig. 2 is a side elevation of the rake, the draft bar being shown in section.

Fig. 3 is a section on line A—B Fig. 1.

Fig. 4 is a plan view of the rear or frame portion of the rake, the tines being removed.

Referring to the figures by characters of reference 1 designates a front beam extending throughout the width of the rake structure and 2 designates a rear beam parallel with the front beam, the two beams being connected at their ends by side strips 3 so that a rectangular frame is thus formed. Formed within the beam 1 at regular intervals are openings 4 and sockets 5 are provided within the front face of the rear beam 2 and directly back of the openings 4. These sockets 5 are adapted to receive the rear or butt ends of the tines 6, said tines being extended through the openings 4. The butt ends of the tines are held within the sockets by removable pins 7 which extend through the tines directly back of the beam 1 so as thus to prevent withdrawal of the tines from the sockets 5.

Secured to the rear beam 2 at the center thereof is a rearwardly projecting bracket 8 to which is connected a caster 9. Cross strips 10 are secured to the beams 1 and 2 adjacent the ends thereof and casters 11 are secured at the forward ends of these cross strips.

Upstanding from the end portions of the front beam 1 are ears 12 and adjacent each ear is a standard 13. Each standard 13 has a slot 14 extending downwardly into the upper end thereof.

Secured to and extending rearwardly from beam 2 close to each end of the beam is a loop 15 and extending through this loop is a draft bar 16, one end portion of which is seated within a socket member 17 secured upon the rear portion of the beam 2. The draft bar is held against withdrawal from the loop 15 by a pin 18 removably mounted in the bar and disposed close to the inner side of the loop 15. The outer end of each bar 16 projects laterally beyond the adjacent side of the frame made up of beams 1, 2 and 3 and has any suitable means such as a loop 19 for engagement by a tree.

A socket member 20 is secured upon beam 2 directly in front of the loop 15 and, if desired, can be made an integral part of the loop. This socket member 20 is adapted to receive the rear or butt end of a draft tongue 21 which tongue extends over the beam 1 between ear 12 and standard 13 and is held in place by a removable pin 22 extending through ear 12, tongue 21 and into standard 13.

Crossed braces 23 may be secured to the beams 1 and 2 as shown. Brackets 24 are preferably secured to the rear face of the beam 2 and are adapted to be engaged by removable standards 25.

Secured to the upper face of the beam 1 at regular intervals are eyes 26 and additional eyes 27 are secured upon the upper face of the rear beam 2. The ends of a rod 28 are mounted within the slot 14 in standards 13 and intermediate portions of the rod are supported by members 29, the lower ends of which are hooked into the eyes 26. Brace rods 30 engage the rod 28 and extend downwardly and rearwardly, these brace rods being hooked into engagement with the eyes 27.

With the parts assembled as described it will be seen that a draft animal can be attached to each beam 21 and bar 16 and the rake can then be drawn forward in the same manner as an ordinary sweep rake. When it is desired to store the rake or to convey it readily through a gateway or the like, the pins 7 are removed from the several tines 6 and said tines thus withdrawn from the sockets 5 and openings 4 and piled upon the braces 23 so as to lie parallel with and between the beams 1 and 2, the standards 25 and 13 coöperating with said braces, beams and strips 3, to form a tine holding crib which will keep the tines piled together. The tongues 21 are then removed by withdrawing pins 22 and are likewise placed longitudinally of said crib. The bars 16 can then be removed by detaching pins 18 and likewise placed longitudinally of the crib. A tree 31 is secured to one side of the frame and by connecting draft animals thereto, it will be seen that the structure can be pulled with one of its sides in advance so that the width of the drawn structure will be the same as the width of the frame 1—2—3. With the structure thus knocked down, it will be seen that the same can be readily handled when drawn from place to place and can be compactly stored. Furthermore by providing a structure such as described, the parts can be quickly assembled.

It will be understood of course that the rod 28, the hooked members 29 and the braces 30 constitute an abutment against which the hay will accumulate while the rake is in use. This abutment can be taken apart by unhooking it from the eyes 26 annd 27 and lifting the rod from the slots 14. Thereupon the abutment can be placed in compact form upon the frame on which the tines, tongues and bars are piled.

What is claimed is:—

A rake, including a frame, tines detachably secured to the frame, a crib formed on the frame for the reception of the detached tines, draft bars detachably secured to the back of the frame and projecting laterally beyond the respective sides thereof, and a separate draft device connected to one side of the frame at the center thereof for transporting the frame when the tines are stored in the crib.

In testimony that I claim the foregoing as my own, I have hereto affixed my signature in the presence of two witnesses.

FRED D. SIMPSON.

Witnesses:
J. H. POOLE,
J. N. CUNNING.

Copies of this patent may be obtained for five cents each, by addressing the "Commissioner of Patents, Washington, D. C."